(12) United States Patent
Yoshinaga et al.

(10) Patent No.: US 7,556,456 B2
(45) Date of Patent: Jul. 7, 2009

(54) MONO CRYSTALLINE DIAMOND CUTTING TOOL FOR ULTRA PRECISION MACHINING

(75) Inventors: Miki Yoshinaga, Hyogo (JP); Kazushi Obata, Hyogo (JP)

(73) Assignee: A.L.M.T. Corp., Tokyo (JP)

( * ) Notice: Subject to any disclaimer, the term of this patent is extended or adjusted under 35 U.S.C. 154(b) by 351 days.

(21) Appl. No.: 10/571,605

(22) PCT Filed: Jun. 15, 2005

(86) PCT No.: PCT/JP2005/010912
§ 371 (c)(1),
(2), (4) Date: Mar. 10, 2006

(87) PCT Pub. No.: WO2006/003788
PCT Pub. Date: Jan. 12, 2006

(65) Prior Publication Data
US 2008/0253849 A1    Oct. 16, 2008

(30) Foreign Application Priority Data
Jun. 30, 2004    (JP) .............................. 2004-192649

(51) Int. Cl.
*B23B 27/20*    (2006.01)
*B23B 27/22*    (2006.01)
(52) U.S. Cl. ....................... 407/118; 407/114
(58) Field of Classification Search ............... 407/66, 407/113–116, 120, 118; *B23B 27/20*
See application file for complete search history.

(56) References Cited
U.S. PATENT DOCUMENTS
3,395,434 A * 8/1968 Wirfelt ..................... 407/114
(Continued)

FOREIGN PATENT DOCUMENTS
EP    1 122 010 A1    8/2001
(Continued)

OTHER PUBLICATIONS
Diamond Kogyo Kyokai, "Diamond Tool Manual", Publishing Co., Ltd., May 10, 1979, pp. 97-99.
(Continued)

*Primary Examiner*—Boyer D Ashley
*Assistant Examiner*—Sara Addisu
(74) *Attorney, Agent, or Firm*—Birch, Stewart, Kolasch & Birch, LLP

(57) ABSTRACT

A mono crystalline diamond cutting tool is provided which can perform ultra precision machining on a crystalline material or a hard and brittle material with good swarf discharge and reduced cutting resistance to improve a precision of a cut surface, and has less wear or microchipping of a cutting edge and thus achieves long life. A tip having a cutting edge ridge in a rounded shape at a front end is provided, and a portion of the cutting edge ridge serving at least as a cutting edge is formed to have constant roundness by intersecting a first conical surface as a rake face with a second conical surface as a flank. The cutting edge ridge is rounded with a radius of less than 100 nm, the first conical surface has a width of 1 to 5 μm, and a swarf release face substantially perpendicular to a cutting direction is provided in a portion on a side of the first conical surface opposite a line of the cutting edge ridge. An intersection of the first conical surface and the swarf release face has a rounded face with a radius of 0.1 to 1.0 μm. The first conical surface has a negative rake angle of 15° to 50°.

2 Claims, 4 Drawing Sheets

U.S. PATENT DOCUMENTS

| | | | | |
|---|---|---|---|---|
| 3,866,282 A | * | 2/1975 | Lundgren | 407/116 |
| 4,044,439 A | * | 8/1977 | Romagnolo | 407/114 |
| 4,626,141 A | * | 12/1986 | Malaker et al. | 407/114 |
| 5,078,551 A | * | 1/1992 | Oomen | 407/119 |
| 5,523,071 A | * | 6/1996 | Jackson et al. | 423/446 |
| 6,315,502 B1 | * | 11/2001 | Maurer | 407/119 |
| 6,612,786 B1 | * | 9/2003 | Kanada et al. | 407/118 |
| 6,655,881 B2 | * | 12/2003 | Shimizu | 407/113 |
| 7,341,408 B2 | * | 3/2008 | Kratz | 407/113 |
| 2002/0076284 A1 | * | 6/2002 | Kato | 407/114 |
| 2003/0133763 A1 | | 7/2003 | Kuroda et al. | |
| 2006/0120816 A1 | * | 6/2006 | Morimoto et al. | 409/132 |
| 2007/0116531 A1 | * | 5/2007 | Okita et al. | 407/114 |
| 2008/0286558 A1 | * | 11/2008 | Kukino et al. | 428/323 |

FOREIGN PATENT DOCUMENTS

| | | | | |
|---|---|---|---|---|
| JP | 63-144903 A | | 6/1988 | |
| JP | 63-237803 A | | 10/1988 | |
| JP | 64-16304 A | | 1/1989 | |
| JP | 64-64702 A | | 3/1989 | |
| JP | 2-53302 U | | 4/1990 | |
| JP | 02198704 A | * | 8/1990 | |
| JP | 5-8104 A | | 1/1993 | |
| JP | 6-190610 A | | 7/1994 | |
| JP | 08318411 A | * | 12/1996 | |
| JP | 10-43903 A | | 2/1998 | |
| JP | 11-347807 A | | 12/1999 | |
| JP | 2000-190108 A | | 7/2000 | |
| JP | 2000326110 A | * | 11/2000 | |
| JP | 2003-94230-4 | | 4/2003 | |
| JP | 2003-117717 A | | 4/2003 | |
| JP | 2003175408 A | * | 6/2003 | |
| JP | 2004-154892 A | | 6/2004 | |
| JP | 2004291204 A | * | 10/2004 | |
| JP | 2004-306153 A | | 11/2004 | |
| JP | 2204-306153 A | | 11/2004 | |
| JP | 2005319529 A | * | 11/2005 | |
| JP | 2007283487 A | * | 11/2007 | |

OTHER PUBLICATIONS

Diamond Kogyo Kyokai, "Diamond Tool Manual", Kogyo Chosakai Publishing Co., Ltd. May 10, 1979, pp. 97-99.

* cited by examiner

MONO CRYSTALLINE DIAMOND CUTTING TOOL FOR ULTRA PRECISION MACHINING

TECHNICAL FIELD

The present invention relates to a mono crystalline diamond cutting tool to perform ultra precision machining on a crystalline material such as Si, Ge, or $CaF_2$, and on a hard and brittle material used for such as a cemented carbide, glass, or a mold base material.

BACKGROUND ART

Recently, to cope with rapid diffusion of optoelectronics technology into such as digital consumer electronics and needs for a high-precision, highly functional product, a crystalline material such as Si, Ge, or $CaF_2$, and a hard and brittle material such as a cemented carbide mold or glass are used, and an ultra precision diamond cutting tool is used to cut these materials with high precision. An example of the cutting tool is a diamond cutting tool using a mono crystalline diamond tip as a cutting edge. As a specific example of the diamond tip, there is a diamond tip having a conical rake face to finish with good shape accuracy and surface roughness when turning a brittle material to have a curved surface (see for example Japanese Patent Laying-Open No. 63-237803 (Patent Document 1)).

Further, as a tool having a shape similar to that of the above-mentioned diamond tip, a mono crystalline cutting tool is provided in which a nose portion of the cutting tool is rounded to have a rake face with a negative rake angle, and the rake face is formed as a portion of a conical surface of a right circular cone (see for example Japanese Patent Laying-Open No. 64-64702 (Patent Document 2)).

Furthermore, a diamond cutting tool is provided in which an edge portion made of mono crystalline diamond is fixed to a tool body such that a rake face of the edge portion has a rake angle set negative in the range from −25° to −60° as shown in FIGS. 5A to 5C to cut a ductile and difficult-to-machine material such as high silicon aluminium or Ni-resist cast iron (see for example Japanese Patent Laying-Open No. 11-347807 (Patent Document 3)). In addition, as a method to perform ultra precision machining on a crystalline material such as a ZnSe lens, a method is provided by which a single cutting tool performs cutting from rough work to finish work using a mono crystalline diamond cutting tool having a rake angle of −20° to 20°, a clearance angle of 5° to 10°, and a cutting edge chamfered in a width of 0.5 to 2 μm to prevent the edge from getting chipped, as shown in FIGS. 6A and 6B (see for example Japanese Patent Laying-Open No. 10-43903 (Patent Document 4)).

Patent Document 1: Japanese Patent Laying-Open No. 63-237803

Patent Document 2: Japanese Patent Laying-Open No. 64-64702

Patent Document 3: Japanese Patent Laying-Open No. 11-347807

Patent Document 4: Japanese Patent Laying-Open No. 10-43903

DISCLOSURE OF THE INVENTION

Problems to be Solved by the Invention

When performing ultra precision machining on a difficult-to-machine material, a crystalline material, or a hard and brittle material using a mono crystalline diamond cutting tool as in the above Patent Documents 3 and 4, the rake angle is set negative to prevent precision degradation in a cut surface and chipping of the edge. However, when the rake angle is set negative, the rake face is generally provided as a sloping face as shown in FIG. 3, and there arise problems described below when such a rake face is employed in a cutting tool having a cutting edge in a rounded shape.

Firstly, even when the rake angle is set negative, an effective rake angle varies depending on a position where the cutting edge works, and the cutting edge on a rear end side has a significantly smaller negative rake angle than the cutting edge on a front end side, due to the reason described below. FIG. 4 schematically shows the case where a diamond cutting tool is used in a two-axis controlled turning machine, which is most commonly used, to cut a workpiece to have a spherical surface. Workpiece 11 is rotated around a rotation axis 12, and it is cut as a diamond cutting tool 1 is fed in X-axis and Z-axis directions. In this case, when diamond cutting tool 1 is on the rotation axis, a front end portion A of a cutting edge 5 works on the workpiece, and a sloping angle of a rake face serves as a rake angle on this occasion. However, when diamond cutting tool 1 is fed in the X-axis and Z-axis directions and a portion B of cutting edge 5 comes to work on the workpiece, the rake angle becomes smaller. As a result, an effective rake angle varies, causing variations in surface roughness of the workpiece. Further, the working portion of cutting edge 5 also moves in a Y-axis direction (although not shown in FIG. 4, the Y-axis direction refers to a direction perpendicular to the plane of the drawing), and diamond cutting tool 1 should also be moved in the Y-axis direction. Although diamond cutting tool 1 can be moved in the Y-axis direction when a three-axis controlled turning machine is used, it cannot be moved in the case of using a two-axis controlled turning machine. Since a two-axis controlled turning machine is often used in ultra precision machining at present, this results in deterioration of cutting precision.

Secondly, there arises a problem caused by the cutting edge having an oval shape instead of a constantly rounded shape. When a workpiece is cut with such a cutting edge to have a spherical or aspherical surface, it is necessary to perform cutting once, calculate a correction value based on a cut shape and formulate a cutting program, and perform originally desired cutting using the program, because the position of cutting edge 5 in the Y-axis direction varies depending on the position where cutting edge 5 works as described above. Since the above process involves a correction step, it requires much time and effort.

Thirdly, since the height of the cutting edge also varies depending on the position where the rounded cutting edge works, stable cutting cannot be provided, which may result in a shape error. This is because the position of cutting edge 5 in the Y-axis direction varies, that is, a cutting tool's edge height varies, depending on the position where cutting edge 5 works as described above. In particular, a significant shape error is likely to occur when a workpiece is cut to have an aspherical surface.

These three problems described above could be solved to some extent by using a tool having a cutting edge in a shape as described in Patent Document 1 or 2. However, since a large portion of the rake face along the cutting edge has a negative angle in such a tool as in the tool described in Patent Document 3 or 4, swarf is likely to accumulate between the rake face and a cut surface, deteriorating a precision of the cut surface. Specifically, swarf generated at the position where the cutting edge works flows over the rake face when it flows from the front end side to the rear end side of the cutting edge, it is likely to accumulate between the rake face and the cut surface, causing variations in swarf discharge. Consequently, the cut surface does not have stable quality, and thus the precision of the cut surface is deteriorated.

Further, to form a cutting edge in a shape described in each patent document, the amount of diamond being cut is increased, leading to an increase in manufacturing cost. This is because forming a rake face requires an increased amount of diamond being cut, and takes time and effort.

Furthermore, in the case where cutting is performed on a material as described above, wear or microchipping of the cutting edge occurs even with a diamond tip and a diamond cutting tool as described in each patent document, which may shorten tool life.

In view of these facts, one object of the present invention is to provide a mono crystalline diamond cutting tool capable of performing ultra precision machining on a crystalline material or a hard and brittle material with high precision without causing a shape error in the cut material, and having less wear or microchipping of a cutting edge and thus achieving long life.

Means for Solving the Problems

A mono crystalline diamond cutting tool for ultra precision machining of the present invention has a first characteristic that it is a diamond cutting tool provided with a mono crystalline diamond tip having a cutting edge ridge in a rounded shape at a front end, and that a portion of the cutting edge ridge serving at least as a cutting edge is formed to have constant roundness by intersecting a first conical surface as a rake face with a second conical surface as a flank, the cutting edge ridge is rounded with a radius of less than 100 nm, the first conical surface has a width of 1 to 5 µm, and a swarf release face substantially perpendicular to a cutting direction is provided in a portion on a side of the first conical surface opposite a line of the cutting edge ridge.

The tool has a second characteristic that an intersection of the first conical surface and the swarf release face has a rounded face having predetermined roundness.

The tool has a third characteristic that the rounded face has a radius of 0.1 to 1.0 µm.

The tool has a fourth characteristic that the first conical surface has a negative rake angle of 15° to 50°.

The tool has a fifth characteristic that there is no lattice defect in a diamond crystal within a range of 100 µm from a front end of the cutting edge.

Effects of the Invention

The mono crystalline diamond cutting tool of the present invention can perform ultra precision machining on a crystalline material or a hard and brittle material with good swarf discharge and reduced cutting resistance, improving a precision of a cut surface. Further, it can perform cutting with high precision without causing a shape error in the cut material, and its life can be improved since it has less wear or microchipping of the cutting edge.

Figure 1A:
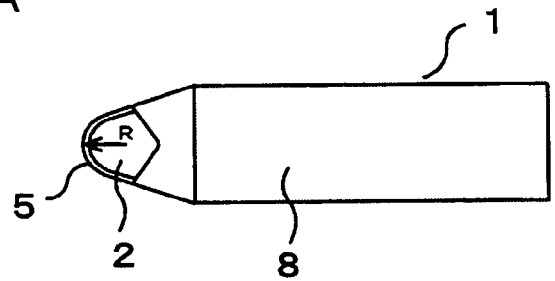
FIG. 1A is a plan view showing a mono crystalline diamond tool of the present invention.

DESCRIPTION OF THE REFERENCE SIGNS 1 diamond cutting tool
2 tip
3 rake face
4 flank
5 cutting edge
6 swarf release face
7 rounded face
8 tool body

BEST MODES FOR CARRYING OUT THE INVENTION

Figure 1B:
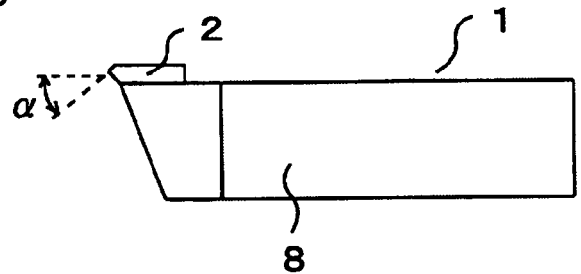
FIG. 1B is a front view showing the mono crystalline diamond tool of the present invention.
Figure 1C:
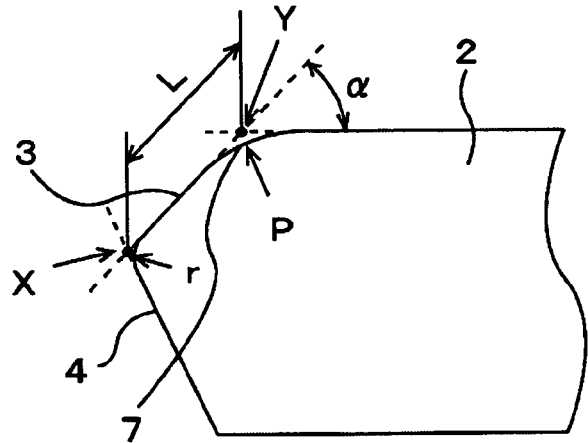
FIG. 1C is a fragmentary enlarged front view showing a portion in the vicinity of a cutting edge of the mono crystalline diamond tool of the present invention.
Figure 2:
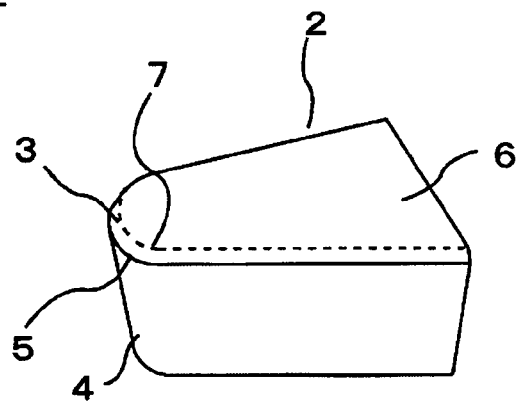
FIG. 2 is a perspective view showing an example of a diamond tip of the mono crystalline diamond tool of the present invention.
Figure 3:
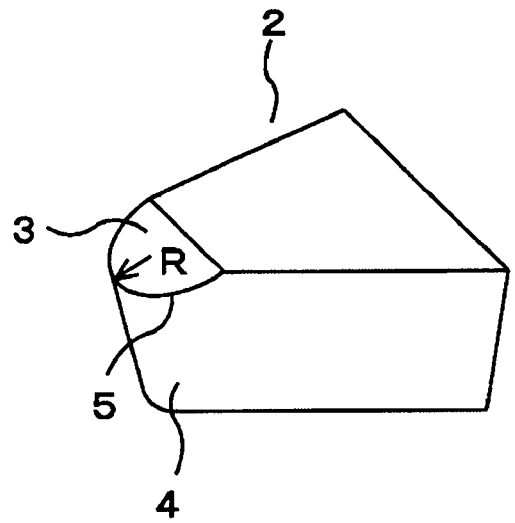
FIG. 3 is a perspective view showing an example of a diamond tip of a conventional mono crystalline diamond tool.
Figure 4:
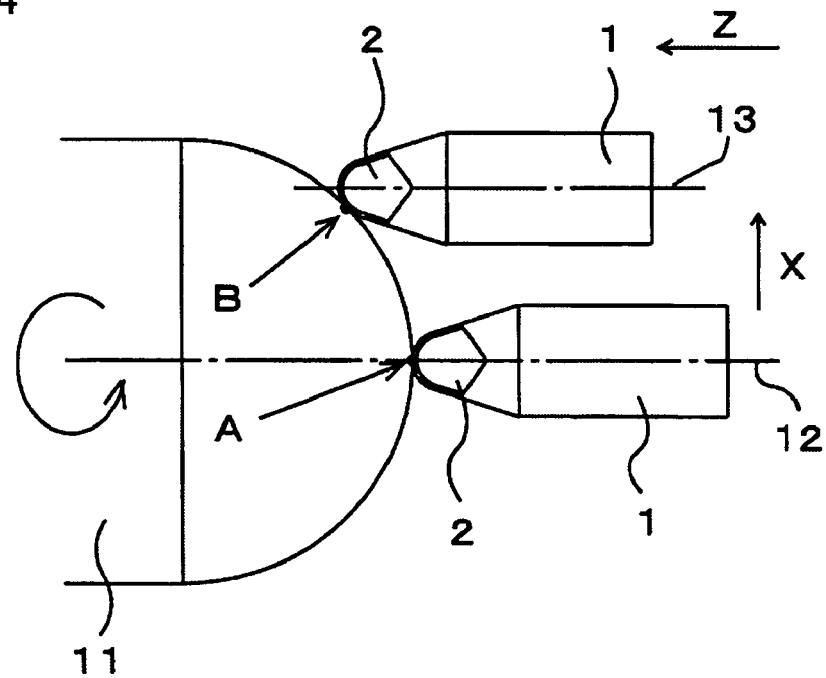
FIG. 4 illustrates a state during cutting with a two-axis controlled turning machine.

FIGS. 1A to 1C show a mono crystalline diamond cutting tool as an example of a mono crystalline diamond cutting tool of the present invention, and FIG. 2 shows a fragmentary enlarged perspective view of a tip thereof. In a diamond cutting tool 1, a tip 2 made of mono crystalline diamond is fixed at a front end portion of a tool body 8 made of such as a cemented carbide, by means of brazing or the like. Tip 2 has a cutting edge 5 in a rounded shape at a front end, and cutting edge 5 is formed by intersecting a rake face 3 with a flank 4. A portion of rake face 3 serving at least as a cutting edge is formed of a first conical surface, and the portion has a width of 1 to 5 µm and a negative rake angle of 15° to 50°. A portion of flank 4 serving at least as a cutting edge is formed of a second conical surface. Both of the faces have planes on a rear end side continuing from the respective conical surfaces, and a linear ridge line not serving as a cutting edge is formed at an intersection of these planes.

With this shape, an effective rake angle does not vary even when the position where the rounded cutting edge works varies, providing stable cut surface roughness. Consequently, a cut surface having high precision can be obtained, and control over the position of the cutting edge can be facilitated. Further, since the rake face has a conical surface, the cutting edge can have constant roundness.

It is to be noted that a width of rake face 3 in the present invention refers to a distance L between a point X where rake face 3 and flank 4 intersect and a point Y where rake face 3 and a swarf release face 6 intersect, as shown in FIG. 1C.

The ridge line of cutting edge 5 is rounded with a radius of less than 100 nm, providing a sharp cutting edge. This shape allows ultra precision machining with a sharp edge.

Swarf release face 6 is formed on the rear end side of the conical portion of rake face 3 (on the side opposite to the side on which cutting edge 5 is formed), as a face substantially perpendicular to the cutting direction. A rounded face 7 is formed at an intersection of rake face 3 and swarf release face 6. Thereby, in conjunction with an effect of the rake face having a conical shape with a minute width, swarf discharge is improved, causing no adverse effect such as reduction in a precision of a cut surface. Preferably, rounded face 7 has roundness with a radius P of 0.1 to 1.0 μm to improve swarf discharge and reduce cutting resistance.

To form cutting edge 5, the mono crystalline diamond is provided to have no lattice defect in a diamond crystal within a range of 100 μm from the front end, and thus there is no lattice defect in the vicinity of cutting edge 5. Thereby, wear or microchipping less occurs even when sharp cutting edge 5 is provided as described above, extending tool life.

First Example

Figure 5A:
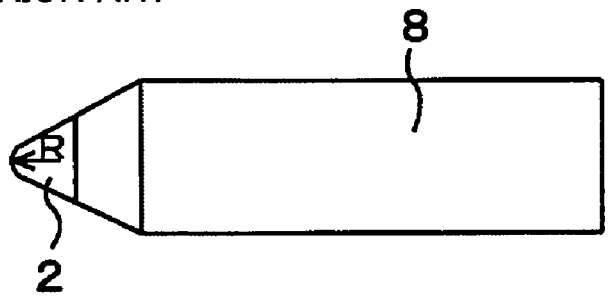
FIG. 5A is a plan view showing another example of the conventional mono crystalline diamond tool.
Figure 5B:
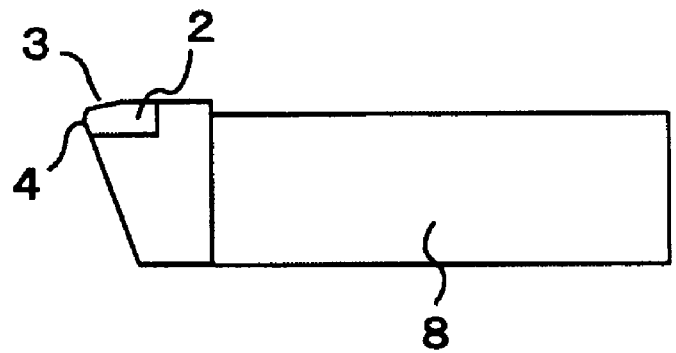
FIG. 5B is a front view showing the another example of the conventional mono crystalline diamond tool.
Figure 5C:
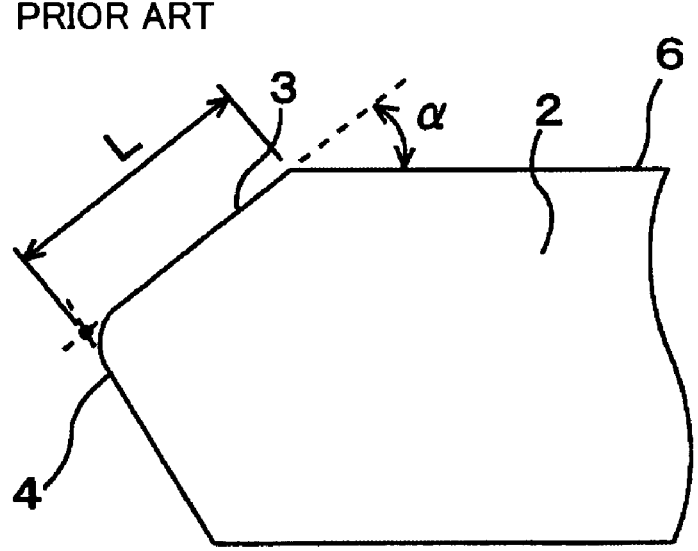
FIG. 5C is a fragmentary enlarged front view showing a portion in the vicinity of a cutting edge in the another example of the conventional mono crystalline diamond tool.
Figure 6A:
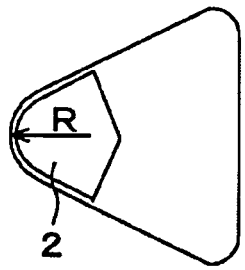
FIG. 6A is a plan view showing still another example of the conventional mono crystalline diamond tool.
Figure 6B:
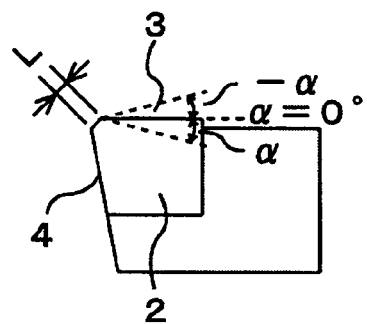
FIG. 6B is a front view showing the still another example of the conventional mono crystalline diamond tool.
Figure 7A:
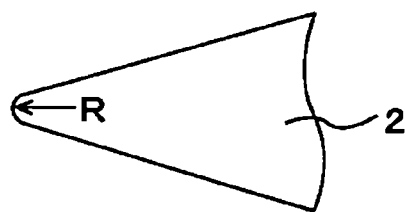
FIG. 7A is a plan view showing another example of the diamond tip of the conventional mono crystalline diamond tool.
Figure 7B:
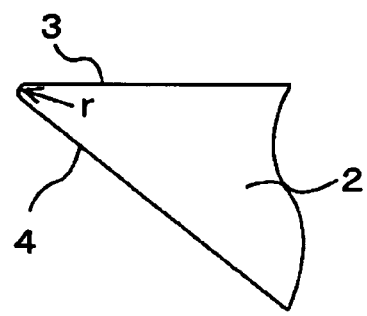
FIG. 7B is a front view showing the another example of the diamond tip of the conventional mono crystalline diamond tool.

As a mono crystalline diamond tool of the present invention, a diamond cutting tool shown in FIGS. 1A to 1C (hereinafter will be referred to as an example of the present invention) was fabricated. As comparative examples, a conventional mono crystalline diamond cutting tool shown in FIGS. 5A to 5C (hereinafter will be referred to as a first comparative example) and a mono crystalline diamond cutting tool having a cutting edge shown in FIGS. 7A and 7B (hereinafter will be referred to as a second comparative example) were fabricated. These tools were used to cut mono crystalline silicon for performance comparison. In the example of the present invention, a width L of a rake face was set at 1.2 μm, a rake angle α was set as a negative angle of 15°, a cutting edge ridge line had roundness with a radius r of 60 nm, and rounded face 7 had a radius P of 0.3 μm. In the first comparative example, width L of a rake face was set at 100 μm, rake angle α was set as a negative angle of 25°, an intersection of rake face 3 and swarf release face 6 had a non-rounded edge, and a cutting edge ridge line had roundness with radius r of 100 nm. In the second comparative example, rake angle α was set at 0°, and a cutting edge ridge line had roundness with radius r of 100 nm. In each diamond cutting tool, a radius R of the cutting edge ridge was set at 1.2 mm.

Each of these diamond cutting tools was attached to a two-axis controlled turning machine to cut the mono crystalline silicon to have a spherical surface by means of CNC two-axis control technique. Wet cutting was performed with the number of workpiece spindle revolutions of 2000 rpm, a tool feed rate of 0.00175 mm/revolution, and a depth of 0.0015 mm. To measure cutting resistance during the cutting, a vibration acceleration sensor was attached on the rear end side of the diamond cutting tool to measure vibration acceleration.

As a result of performing the cutting with the tools and under the condition as described above, surface roughness Ra obtained in an initial stage of the cutting was 0.0067 μm in the example of the present invention. The surface roughness was gradually deteriorated as the cutting was repeatedly performed, and in the end, 60 workpieces were cut with allowable surface roughness. Further, a PV (peak and valley) value of 0.042 μm, an rms (root mean square) value of 0.009 μm, and cutting resistance during the cutting (vibration acceleration) of 0.05 G were obtained.

In contrast, in the first comparative example, surface roughness Ra obtained in an initial stage of the cutting was 0.0085 μm. The surface roughness was gradually deteriorated as the cutting was repeatedly performed, and in the end, 25 workpieces were cut with allowable surface roughness. Consequently, the tool life was less than half that in the example of the present invention. Further, a PV value of 0.047 μm, an rms value of 0.010 μm, and cutting resistance during the cutting (vibration acceleration) of 0.08 G were obtained, all of which were higher than the values obtained in the example of the present invention.

In the second comparative example, surface roughness Ra obtained in an initial stage of the cutting was 0.0138 μm, almost double that of the example of the present invention. Since chipping occurred during the cutting, only two workpieces were cut. Further, a PV value of 0.081 μm, an rms value of 0.018 μm, and cutting resistance during the cutting (vibration acceleration) of 0.2 G were obtained, all of which were significantly higher than the values obtained in the example of the present invention.

As have been described above, it has been found that the mono crystalline diamond tool of the present invention has good swarf discharge, improving the precision of the cut surface. It has also been found that the tool can perform cutting with high precision without causing a shape error in the cut material, and its life is improved since it has less wear or microchipping of the cutting edge.

INDUSTRIAL APPLICABILITY

The mono crystalline diamond tool of the present invention is applicable to a cutting tool for performing ultra precision machining on a crystalline material, a hard and brittle material, a difficult-to-machine material, or the like.

The invention claimed is:

1. A diamond cutting tool provided with a mono crystalline diamond tip having a cutting edge ridge in a rounded shape at a front end,
    wherein a portion of said cutting edge ridge serving at least as a cutting edge is formed to have constant roundness by intersecting a first conical surface as a rake face with a second conical surface as a flank, said cutting edge ridge is rounded with a radius of less than 100 nm, said first conical surface has a width of 1 to 5 μm, and a swarf release face substantially perpendicular to a cutting direction is provided in a portion on a side of said first conical surface opposite a line of said cutting edge ridge, and
    a rounded face joins said first conical surface and said swarf release face.

2. The mono crystalline diamond tool according to claim 1, wherein said rounded face has a radius of 0.1 to 1.0 μm.

* * * * *